United States Patent
Yoon et al.

(10) Patent No.: US 9,937,966 B1
(45) Date of Patent: Apr. 10, 2018

(54) APPARATUS FOR IMPROVING AERODYNAMIC PERFORMANCE OF VEHICLE

(71) Applicant: HYUNDAI MOTOR COMPANY, Seoul (KR)

(72) Inventors: Jin Young Yoon, Gimpo-si (KR); Hyun Gyung Kim, Hwaseong-si (KR); Keon Soo Jin, Ulsan (KR); Ki Hong Lee, Seoul (KR); Dong Eun Cha, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/372,912

(22) Filed: Dec. 8, 2016

(30) Foreign Application Priority Data

Oct. 11, 2016 (KR) .................. 10-2016-0131044

(51) Int. Cl.
| | | |
|---|---|---|
| *B60J 9/00* | (2006.01) | |
| *B62D 35/00* | (2006.01) | |
| *B62D 35/02* | (2006.01) | |
| *B62D 25/18* | (2006.01) | |
| *F15B 15/10* | (2006.01) | |
| *F03G 7/06* | (2006.01) | |

(52) U.S. Cl.
CPC ......... *B62D 35/005* (2013.01); *B62D 25/182* (2013.01); *B62D 35/02* (2013.01); *F03G 7/065* (2013.01); *F15B 15/10* (2013.01)

(58) Field of Classification Search
CPC ... B60R 21/237; B60R 16/0222; A61L 27/34; A61M 25/0074; E21B 43/123; B62D 35/001; B62D 35/00; B62D 35/002; B60J 10/70; B60P 3/343

USPC ...................................................... 296/180.1
See application file for complete search history.

(56) References Cited

U.S. PATENT DOCUMENTS

| | | | | |
|---|---|---|---|---|
| 4,095,835 A * | 6/1978 | Ensor | ................... | B62D 35/001 |
| | | | | 105/1.2 |
| 4,214,786 A * | 7/1980 | Morrison | ............. | B62D 35/001 |
| | | | | 296/180.2 |
| 4,313,635 A * | 2/1982 | Front | ................... | B62D 35/001 |
| | | | | 296/180.3 |
| 4,441,751 A * | 4/1984 | Wesley | .................. | B62D 35/00 |
| | | | | 105/1.1 |
| 4,915,441 A * | 4/1990 | Nitzke | ................... | B62D 25/10 |
| | | | | 180/89.17 |
| 6,079,769 A * | 6/2000 | Fannin | ................. | B62D 35/005 |
| | | | | 296/180.1 |

(Continued)

FOREIGN PATENT DOCUMENTS

| | | |
|---|---|---|
| JP | 4301124 B2 | 7/2009 |
| KR | 10-2004-0014780 A | 2/2004 |
| KR | 10-2006-0056084 A | 5/2006 |

OTHER PUBLICATIONS

Office Action dated Aug. 22, 2017 of corresponding Korean Patent Application No. 10-2016-0131044—6 pages.

*Primary Examiner* — Kiran B Patel

(74) *Attorney, Agent, or Firm* — Knobbe Martens Olson & Bear LLP

(57) ABSTRACT

An apparatus is configured such that the outer shape of a shape memory material is transformed or changed to be enlarged or decreased in conjunction with vehicle speed and at that time a deflector 30 is actuated to move up and down to actively improve aerodynamic performance of a vehicle.

15 Claims, 5 Drawing Sheets

(56) References Cited

U.S. PATENT DOCUMENTS

| | | | | |
|---|---|---|---|---|
| 7,226,119 | B1* | 6/2007 | Weaver | B60H 1/26 296/180.1 |
| 7,686,382 | B2* | 3/2010 | Rober | B62D 35/007 296/180.1 |
| 7,845,709 | B2* | 12/2010 | Browne | B62D 25/182 296/180.5 |
| 8,702,152 | B1* | 4/2014 | Platto | B62D 35/005 296/180.1 |
| 9,002,484 | B2* | 4/2015 | Hyde | B64C 21/10 114/67 R |
| 9,150,261 | B2* | 10/2015 | DeAngelis | B62D 35/02 |
| 9,266,571 | B2* | 2/2016 | D'Arcy | B62D 35/005 |
| 9,327,775 | B1* | 5/2016 | Guenzel | B62D 35/008 |
| 9,714,059 | B2* | 7/2017 | Fahland | B62D 37/02 |
| 9,738,328 | B2* | 8/2017 | Fahland | B62D 37/02 |
| 9,764,706 | B2* | 9/2017 | Benvenuto | B60R 19/48 |
| 2005/0121240 | A1* | 6/2005 | Aase | B60K 11/085 180/68.1 |
| 2005/0121945 | A1* | 6/2005 | Browne | B62D 35/00 296/180.1 |
| 2005/0194815 | A1* | 9/2005 | Mc Knight | B62D 35/00 296/180.5 |
| 2008/0272615 | A1* | 11/2008 | McKnight | F15D 1/10 296/180.5 |
| 2008/0303309 | A1* | 12/2008 | Dayton | B62D 35/001 296/180.1 |
| 2010/0109377 | A1* | 5/2010 | Calco | B60J 1/20 296/152 |
| 2010/0140976 | A1* | 6/2010 | Browne | B62D 35/005 296/180.1 |
| 2015/0084369 | A1* | 3/2015 | Niemi | B62D 35/02 296/180.1 |
| 2017/0299006 | A1* | 10/2017 | Shi | F16D 65/78 |

* cited by examiner (Side View)

(Front View)

APPARATUS FOR IMPROVING AERODYNAMIC PERFORMANCE OF VEHICLE

CROSS REFERENCE TO RELATED APPLICATION

The present application claims priority of Korean Patent Application No. 10-2016-0131044 filed on Oct. 11, 2016, the entire contents of which is incorporated herein for all purposes by this reference.

BACKGROUND

Field

The present disclosure relates to an apparatus for improving aerodynamic performance of a vehicle.

Description of the Related Art

A vehicle body collides with atmospheric air during running and thereby it is subjected to air resistance, wherein the air resistance force is generally divided into drag force and lift force.

The "drag force" refers to the resistance force to which a vehicle body that directly collides with the air during running is subjected in the opposite direction of travel, whereas the "lift force" generates a phenomenon that the vehicle body floats due to a difference in pressure produced on the upper and lower portions of the vehicle body during running.

Therefore, vehicles are required to have an attachment for improving aerodynamic performance and fuel economy by reducing both drag force and lift force.

The disclosure of this section is to provide background of the invention. Applicant notes that this section may contain information available before this application. However, by providing this section, Applicant does not admit that any information contained in this section constitutes prior art.

SUMMARY

It is an aspect of the present invention to provide an apparatus for improving aerodynamic performance of a vehicle that can more effectively improve aerodynamic performance of a vehicle by actively increasing or decreasing amount of shielding the front of front tires in conjunction with vehicle speed.

An apparatus for improving aerodynamic performance of a vehicle comprises: a shape memory material whose outer shape changes when it is subjected to pressure; a deflector installed to be connected to the shape memory material and disposed in front of a tire; and a pneumatic actuator having hoses for supplying and discharging air to and from the shape memory material respectively, operation of the pneumatic actuator being controlled by a controller.

The apparatus further comprises a bellows type resilient member for connecting the shape memory material and a fixture of a vehicle body, of which length varies in such a manner that the length is lengthened when the outer shape of the shape memory material is enlarged whereas the lengthened length is decreased when the outer shape of the shape memory material is restored.

The apparatus further comprises a first electromagnet coupled to the shape memory material and a second electromagnet coupled to the fixture of the vehicle body in such a manner that it faces the first electromagnet, wherein the first and second electromagnets are configured such that supply of current from a power source to the electromagnets is controlled by the controller.

The shape memory material is installed in such a manner that it is disposed at the front side of a front tire and the remaining edge except a rear end thereof is connected to the fixture of the vehicle body.

The shape memory material is characterized in that it is deformed into a memorized shape with volume of its outer shape enlarged when pressure of the air supplied from the pneumatic actuator is greater than a reference value, whereas it adheres closely to the fixture of the vehicle body with its shape restored when the pressure is equal to or lower than the reference value.

An inner space of the bellows type resilient member is formed as a sealed space and air generated by the pneumatic actuator is supplied to the inner space of the bellows type resilient member.

The inner space of the bellows type resilient member is formed as a sealed space and a supply hose for supplying air to the inner space of the bellows type resilient member and a discharge hose for discharging air are connected to the pneumatic actuator.

The inner space of the bellows type resilient member is formed as a sealed space and first and second electromagnets are disposed in the inner space of the bellows type resilient member.

The controller is configured to receive signal of a vehicle speed sensor and control operation of the pneumatic actuator.

The shape memory material is characterized in that it is transformed to have a certain curvature from a front end to a rear end while the front end thereof is transformed into a pointed wedge shape when the outer shape of the shape memory material is transformed to be enlarged.

The deflector is vertically coupled to the rear end of the shape memory material and actuated to vertically move up and down when the shape of the shape memory material is transformed.

The fixture of the vehicle body is any one of an undercover and a front wheel guard which are positioned at the front side of the front tire.

The first and second electromagnets have polarities different from each other such that attraction force acts between them when current is supplied to them from the power source.

The first and second electromagnets are supplied with current and magnetized when the vehicle speed is equal to or lower than the reference vehicle speed, whereas when the vehicle speed is higher than the reference vehicle speed, supply of current is blocked and hence the first and second electromagnets do not represent magnetism.

The shape memory material is made of a soft plastic.

According to embodiments of the present invention, there is effect that external volume of the shape memory material is transformed to be enlarged or decreased in conjunction with the vehicle speed and at that time the deflector is actuated to move up and down to actively increase or decrease the amount of shielding the front of the front tire, thereby improving the aerodynamic performance of the vehicle more effectively.

DESCRIPTION OF EMBODIMENTS

Figure 1:
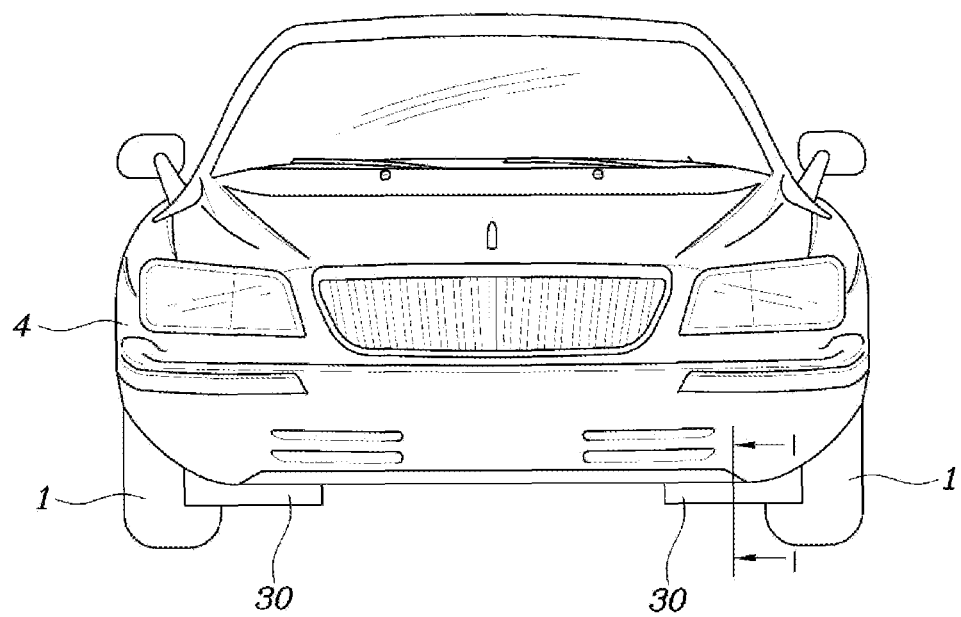
FIG. 1 is a front view of a vehicle to which an apparatus for improving aerodynamic performance according to embodiments of the present invention is applied.

An apparatus for improving aerodynamic performance according to an embodiment of the present invention will now be described in detail with reference to the accompanying drawings. However, the present invention is not limited or restricted by the embodiment.

As an example of a device for improving aerodynamic performance, there is a technology for enhancing aerodynamic performance by reducing the amount of air flowing into the underbody of a vehicle during high-speed running and hence reducing lift force by means of a deflector (also referred to as air skirt, front spoiler, nose spoiler, air dam, etc.) located in front of the front tires and projected downward.

An apparatus for improving aerodynamic performance according to embodiments of the present invention comprises: a shape memory material 10 installed in such a manner that it is disposed at the front side of a front tire 1 and the remaining edge except a rear end thereof is connected to a fixture 2 of a vehicle body as shown in FIGS. 1 to 5, the shape memory material being transformed or deformed into a memorized shape with volume of its outer shape enlarged when it is subjected to pressure greater than a reference value, whereas the shape memory material adhering closely to the fixture 2 of the vehicle body with its shape restored when the pressure is equal to or lower than the reference value; a bellows type resilient member 20 connecting a rear end of the shape memory material 10 and the fixture 2 of the vehicle body to form a sealed space 3 between the shape memory material 10 and the fixture 2 of the vehicle body, the bellows type resilient member varying in its length in such a manner that the length is lengthened when the shape memory material 10 is transformed or changed such that its outer shape is enlarged whereas the lengthened length is decreased when the shape memory material 10 is restored such that it adheres closely to the fixture 2 of the vehicle body; a deflector 30 having an upper end coupled to the rear end of the shape memory material 10 and a lower end projected downward; and an pneumatic actuator 40 having a supply hose 41 for supplying air to the space 3 between the shape memory material 10 and the fixture 2 of the vehicle body and a discharge hose 42 for discharging air, the pneumatic actuator being controlled by a controlled 50.

Preferably, the fixture 2 of the vehicle body is any one of an undercover and a front wheel guard which are positioned at the front side of the front tire 1, but not limited thereto.

The undercover is configured to be connected to a front bumper 4 while the front wheel guard has a structure to be coupled to a wheel housing.

The shape memory material 10 is preferably a soft plastic, that is, a shape memory plastic (SMP), but not limited thereto.

The shape memory material 10 is transformed or deformed to have a certain curvature from a front end to a rear end while the front end thereof is transformed into a pointed wedge shape when the outer shape of the shape memory material is transformed to be enlarged, which makes it possible to flow air smoothly.

The space 3 between the shape memory material 10 and the fixture 2 of the vehicle body may be of a structure in which only the rear side is opened to be connected to the outside regardless of presence or absence of the resilient member 20.

More preferably, however, the space 3 is sealed by the resilient member 20 such that the air in the space 3 is easily discharged through the discharge hose 42 when the pneumatic actuator 40 is operated and thereby the shape memory material 10 can be restored more quickly when it is restored to adhere closely to the fixture 2 of the vehicle body.

The resilient member 20 is preferably a bellows type spring member which is formed in a size capable of sealing the space 3 and can be sequentially folded, but not limited thereto.

The deflector 30 has a structure that is coupled to the rear end of the shape memory material 10 vertically and is actuated to vertically move up and down when the shape of the shape memory material 10 is transformed or changed.

That is, in order to improve aerodynamic performance of a vehicle more effectively by actively increasing or decreasing the amount of shielding the front of the front tire 1 in conjunction with vehicle speed, it is preferable that the deflector 30 is actuated to vertically move up and down.

The apparatus according to embodiments of the present invention further comprises a first electromagnet 60 coupled to the rear end of the shape memory material 10 and a second electromagnet 70 coupled to the fixture 2 of the vehicle body in such a manner that it faces the first electromagnet 60, wherein the first and second electromagnets 60, 70 are configured such that supply of current from a power source 80 to the electromagnets is controlled by the controller 50.

The controller 50 can control intensity of current supplied to the first and second electromagnets 60, 70 and therefore intensity of magnetic force of the first and second electromagnets 60, 70.

The first and second electromagnets 60, 70 have polarities different from each other such that attraction force acts between them when current is supplied to them from the power source 80. In other words, when the first electromagnet 60 becomes the S pole, the second electromagnet 70 becomes the N pole, whereas when the first electromagnet 60 becomes the N pole, the second electromagnet 70 becomes the S pole.

The first and second electromagnets 60, 70 are supplied with current from the power source 80 through control by the controller 50 and magnetized when the vehicle speed is equal to or lower than the reference vehicle speed (for example, the reference vehicle speed may be set as 60 Km/h), whereas when the vehicle speed is higher than the reference vehicle speed, supply of current is blocked and hence the first and second electromagnets do not represent magnetism.

The controller 50 receives signal from a vehicle speed sensor 90 and then controls operation of the pneumatic actuator 40, so that the shape memory material 10 and the deflector 30 have an active function that they actively operate in conjunction with the vehicle speed.

Operation of the embodiment of the present invention will be described below.

Figure 2:
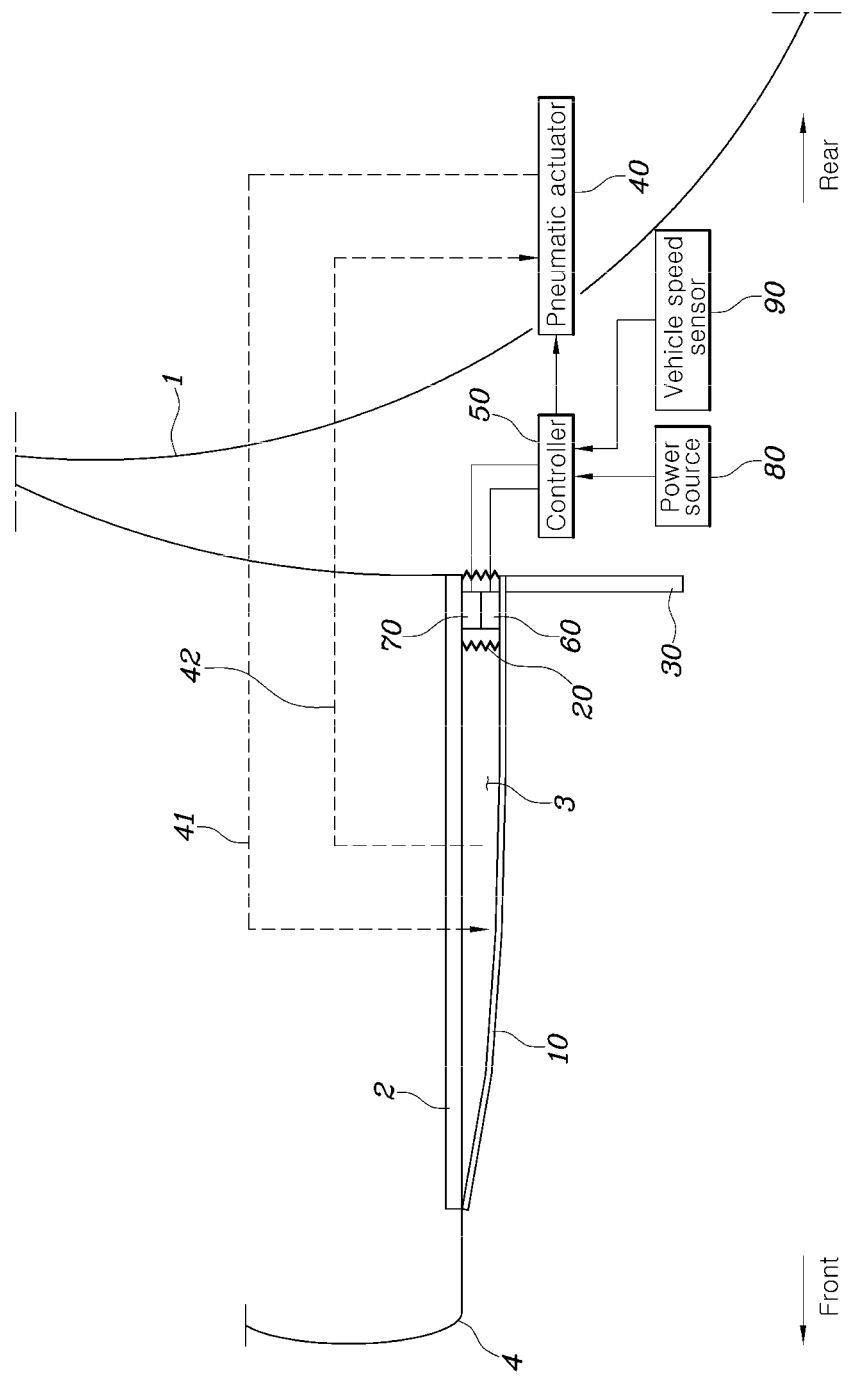
FIG. 2 is a sectional view taken along line I-I in FIG. 1, illustrating a condition before an apparatus for improving aerodynamic performance is operated.

FIG. 2 shows a condition that the vehicle speed is not more than the reference vehicle speed (e.g., 60 km/h) and at that time the first and second electromagnets 60, 70 are supplied with current from the power source 80 through control by the controller 50 and magnetized and the first and second electromagnets 60, 70 are coupled with each other because attraction force acts between them.

Further, when the vehicle speed is lower than the reference vehicle speed (e.g., 60 km/h), the pneumatic actuator 40 is not operated so that the shape memory material 10 remains in a state of adhering closely to the lower side of the fixture 2 of the vehicle body.

As the vehicle speed increases and hence it is higher than the reference vehicle speed, the first and second electromagnets 60, 70 lose their magnetism because current supply from the power source 80 is interrupted by control of the controller 50.

Further, when the vehicle speed is higher than the reference vehicle speed, the pneumatic actuator 40 is operated by control of the controller 50 and the air is supplied to the space 3 between the shape memory material 10 and the fixture 2 of the vehicle body through the supply hose 41 by operation of the pneumatic actuator 40.

As the air is supplied to the space 3, the shape memory material 10 is subjected to pressure. When the pressure to which the shape memory material 10 is subjected exceeds a reference value (i.e., reference pressure), the shape memory material 10 is enlarged from that time, and deformed into its memorized shape and finally becomes a state as shown in FIG. 3.

When the external volume of the shape memory material 10 is enlarged, the deflector 30 coupled to the shape memory material 10 is actuated to move down in a vertical direction, thereby further increasing amount of shielding the front tire 1. As a result, amount of air flowing into the underbody of the vehicle during high-speed running can be reduced greatly, thereby reducing lift force and further improving the aerodynamic performance of the vehicle.

Figure 3:
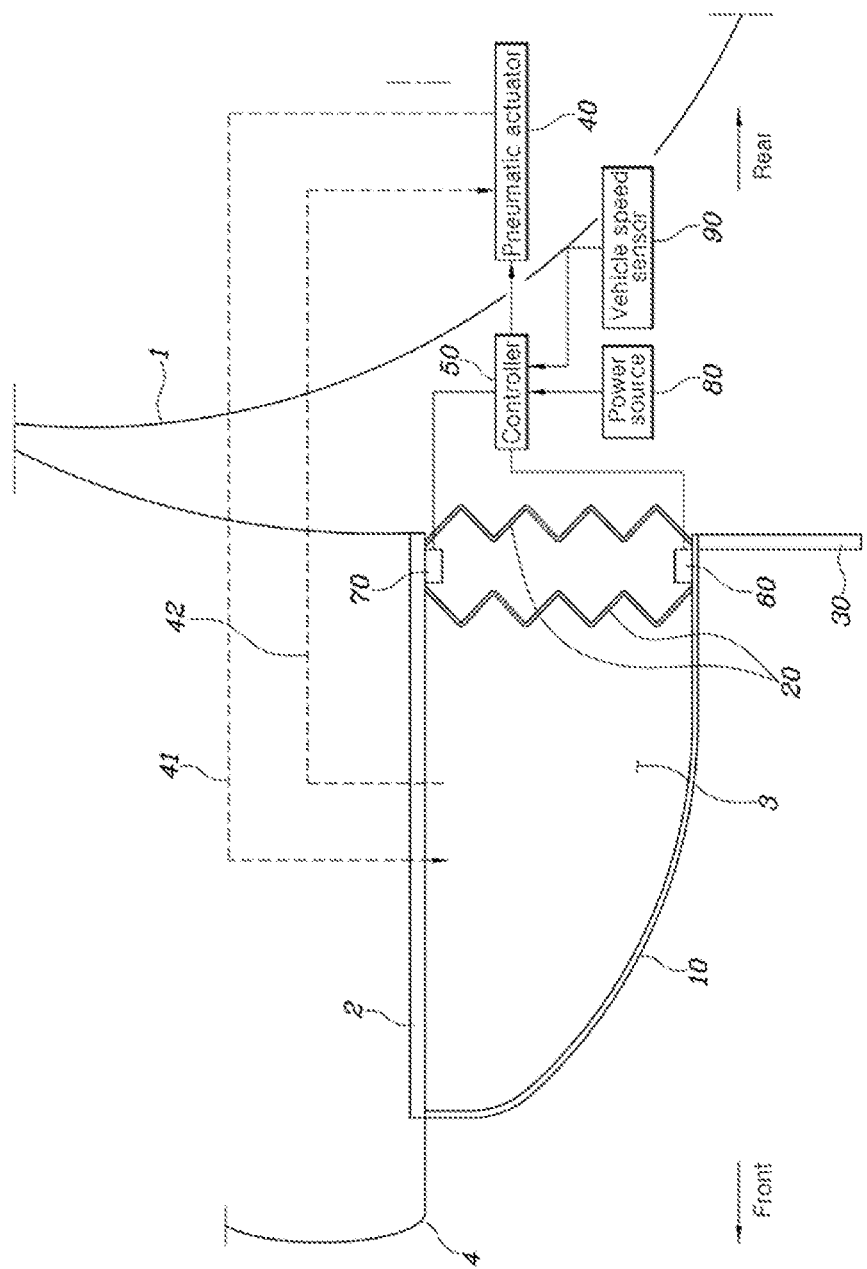
FIG. 3 is a view illustrating a condition after an apparatus for improving aerodynamic performance is operated.
Figure 4A:
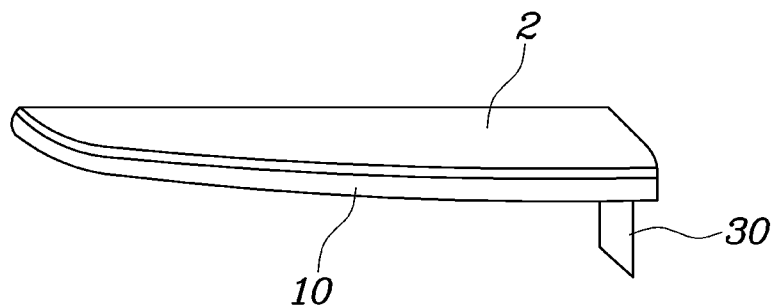
FIGS. 4A and 4B each show side and front perspective views illustrating a condition before an apparatus for improving aerodynamic performance according to embodiments of the present invention is operated.
Figure 4B:
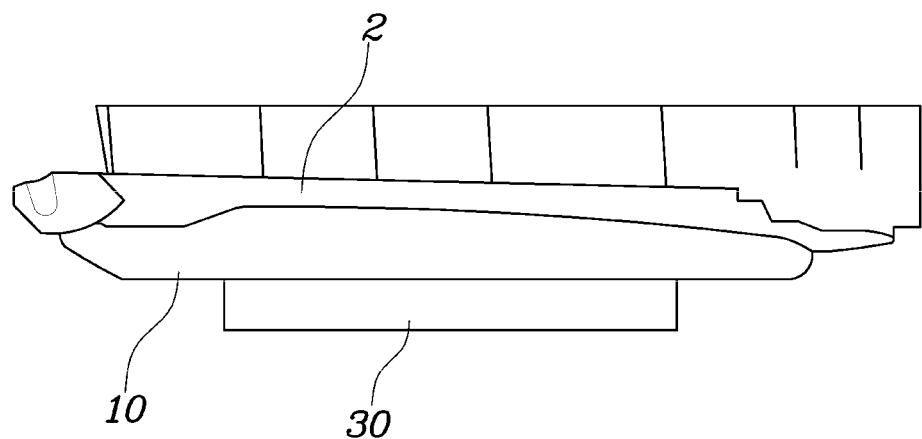
Figure 5A:
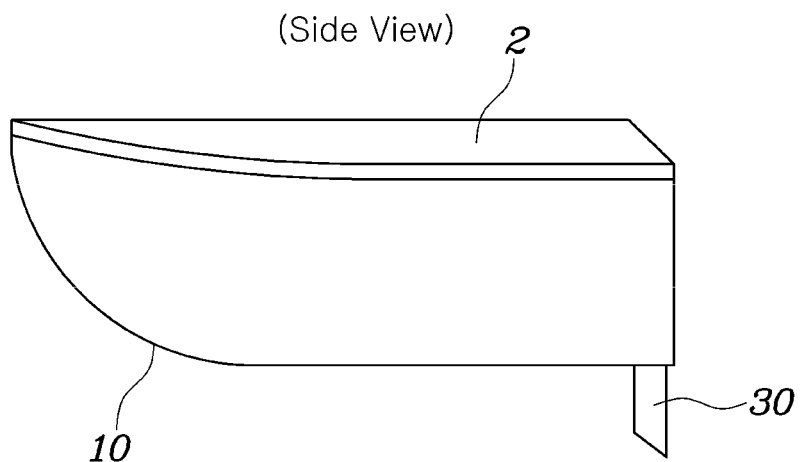
FIGS. 5A and 5B each show side and front perspective views illustrating a condition after an apparatus for improving aerodynamic performance according to embodiments of the present invention is operated.
Figure 5B:
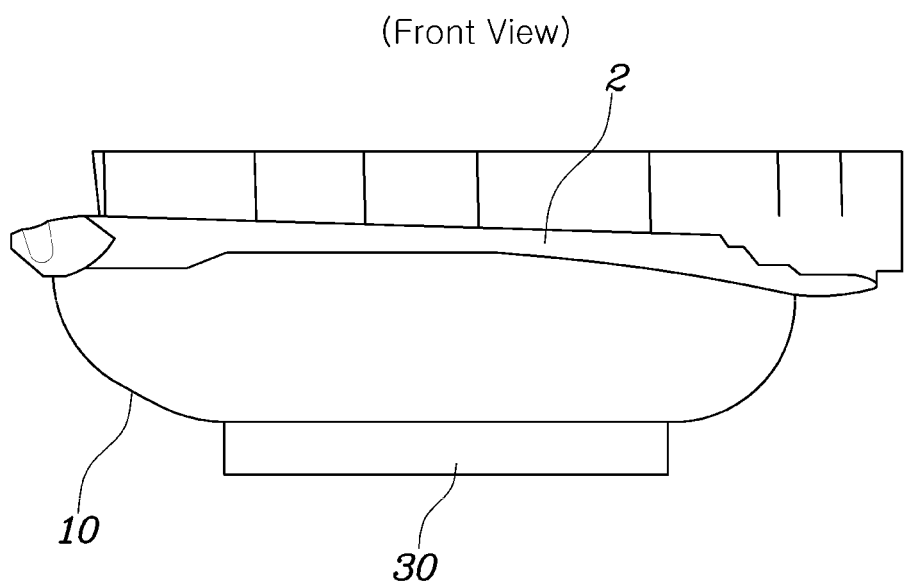

Further, when the vehicle speed is changed to be lower than the reference vehicle speed from the state of FIG. 3, the first and second electromagnets 60, 70 are magnetized again by control of the controller 50 and hence attraction force acts between them while the air existing in the space 3 between the shape memory material 10 and the fixture 2 of the vehicle body is discharged to the outside through the discharge hose 42 by operation of the pneumatic actuator 40.

When the air in the space 3 is discharged to the outside through the discharge hose 42, the pressure to which the shape memory material 10 is subjected becomes gradually low and then equal to or lower than the reference value. From this time, the shape memory material 10 is restored such that the enlarged external volume thereof becomes smaller again and finally adheres closely to the lower side of the fixture 2 of the vehicle body as shown in FIG. 2. At this time, by virtue of the first and second electromagnets 60, 70 coupled with each other, the condition that the shape memory material adhered closely to the lower side of the fixture 2 of the vehicle body can be maintained consistently.

When the shape memory material 10 is restored such that its external volume becomes smaller, the deflector 30 coupled to the shape memory material 10 is actuated to move up in a vertical direction.

In embodiments, referring to FIGS. 1-3, 4A, 4B, 5A and 5B, the apparatus includes a frame 2, a deformable plate 10 and a deflector 30 fixed to the plate 2. The frame 2 is attached to a bottom surface of the vehicle and fixed to the chassis of the vehicle. The frame 2 and the plate 10 with or without other components of the apparatus form a sealed space 3 of a balloon which can inflate or deflate. The plate 2 can be deformed between a first state and a second state. When the sealed space 3 inflates, the plate 2 deforms into the second state and has a bulged or swelled shape. When the sealed space 3 deflates, the plate 2 deforms back to the first state. The plate 10 is made of a shape memory material that can be deformed to a predetermined shape when a pressure greater than a predetermined value is applied to the material.

In embodiments, the plate 10 provides a smooth bottom surface in both the first and second states to guide air to flow smoothly along the bottom surface of the plate 10. The front area of the plate 10 in the second state has a steeper surface than that of the plate 10 in the first state. In one embodiment, the rear area of the plate 10 adjacent the deflector 30 maintains flat and generally parallel to the ground or road both in the first and second states. Further, the deformation of the plate 10 causes the rear area of the plate 10 as well as the deflector 30 to move downward. In one embodiment, a vertical distance between the bottom end of the deflector and the surface of the rear area of the plate 10 does not change between the first and second states, although the bottom end of the deflector 30 is closer to the ground or road than in the first state.

In embodiments, the vehicle includes a controller 50, for example, an ECU, which includes one or more processors for controlling the deformation of the plate 10 by inflating or deflating the sealed space 3. In one embodiment, when the vehicle has a speed greater than a predetermined speed value, the controller 50 controls the air supply actuator 40 to supply air to inflate the sealed space 3 thereby deforming the plate 10 into the second state. When the vehicle slows down to have a speed smaller than the predetermined speed value, the controller 50 controls the air supply actuator 40 to deflate the sealed space 3 thereby deforming the plate 10 back to the first state.

The embodiment according to the present invention as described above has advantageous effect that external volume of the shape memory material 10 is transformed to be enlarged or decreased in conjunction with the vehicle speed and at that time the deflector 30 is actuated to move up and down to actively increase or decrease the amount of shielding the front of the front tire 1, thereby improving the aerodynamic performance of the vehicle more effectively.

Although the present invention has been described and illustrated with respect to specific embodiments, it will be apparent by those who have ordinary skill in the art that various modifications and changes to embodiments of the present invention may be made without departing from the spirit and scope of the present invention as defined in the appended patent claims.

What is claimed is:

1. An apparatus for improving aerodynamic performance of a vehicle comprising:
   a shape memory material structure whose outer shape changes when it is subjected to pressure;
   a deflector installed to be connected to the shape memory material structure and disposed in front of a tire; and
   a pneumatic actuator having hoses for supplying and discharging air to and from the shape memory material structure, respectively, operation of the pneumatic actuator being controlled by a controller.

2. The apparatus of claim 1 further comprising a bellows type resilient member for connecting the shape memory material structure and a fixture of a vehicle body, wherein length of bellows type resilient member varies in such a manner that it is lengthened when the outer shape of the shape memory material structure is enlarged whereas the lengthened length is decreased when the outer shape of the shape memory material structure is restored.

3. The apparatus of claim 1 further comprising a first electromagnet coupled to the shape memory material structure and a second electromagnet coupled to the fixture of the vehicle body in such a manner that it faces the first electromagnet, wherein the first and second electromagnets are configured such that supply of current from a power source to the electromagnets is controlled by the controller.

4. The apparatus of claim 1, wherein the shape memory material structure is installed in such a manner that it is disposed at the front side of a front tire and the remaining edge except a rear end thereof is connected to the fixture of the vehicle body.

5. The apparatus of claim 1, wherein the shape memory material structure is transformed into a memorized shape with volume of its outer shape enlarged when pressure of the air supplied from the pneumatic actuator is greater than a reference value, whereas the shape memory material structure adheres closely to the fixture of the vehicle body with its shape restored when the pressure is equal to or lower than the reference value.

6. The apparatus of claim 2, wherein an inner space of the bellows type resilient member is formed as a sealed space and air generated by the pneumatic actuator is supplied to the inner space of the bellows type resilient member.

7. The apparatus of claim 2, wherein the inner space of the bellows type resilient member is formed as a sealed space and a supply hose for supplying air to the inner space of the bellows type resilient member and a discharge hose for discharging air are connected to the pneumatic actuator.

8. The apparatus of claim 3, wherein the inner space of the bellows type resilient member is formed as a sealed space and first and second electromagnets are disposed in the inner space of the bellows type resilient member.

9. The apparatus of claim 1, wherein the controller is configured to receive signal of a vehicle speed sensor and control operation of the pneumatic actuator.

10. The apparatus of claim 1, wherein the shape memory material structure is transformed to have a certain curvature from a front end to a rear end while the front end thereof is transformed into a pointed wedge shape when the outer shape of the shape memory material structure is transformed to be enlarged.

11. The apparatus of claim 1, wherein the deflector is vertically coupled to the rear end of the shape memory material structure and actuated to vertically move up and down when the shape of the shape memory material structure is transformed.

12. The apparatus of claim 2, wherein the fixture of the vehicle body is any one of an undercover and a front wheel guard which are positioned at the front side of the front tire.

13. The apparatus of claim 3, wherein the first and second electromagnets have polarities different from each other such that attraction force acts between them when current is supplied to them from the power source.

14. The apparatus of claim 3, wherein the first and second electromagnets are supplied with current and magnetized when the vehicle speed is equal to or lower than the reference vehicle speed, whereas when the vehicle speed is higher than the reference vehicle speed, supply of current is blocked so that the first and second electromagnets do not represent magnetism.

15. The apparatus of claim 1, wherein the shape memory material structure is made of a soft plastic.

\* \* \* \* \*